United States Patent
Liu et al.

(10) Patent No.: US 12,202,913 B1
(45) Date of Patent: Jan. 21, 2025

(54) BETA-GLUCAN-RICH LENTINULA EDODES POLYSACCHARIDE AND PREPARATION METHOD THEREOF

(71) Applicant: SHANGHAI ACADEMY OF AGRICULTURAL SCIENCES, Shanghai (CN)

(72) Inventors: Yanfang Liu, Shanghai (CN); Jia Luo, Shanghai (CN); Liping Liu, Shanghai (CN); Jie Feng, Shanghai (CN); Jingsong Zhang, Shanghai (CN); Shuai Zhou, Shanghai (CN)

(73) Assignee: SHANGHAI ACADEMY OF AGRICULTURAL SCIENCES, Shanghai (CN)

( * ) Notice: Subject to any disclaimer, the term of this patent is extended or adjusted under 35 U.S.C. 154(b) by 0 days.

(21) Appl. No.: 18/813,024

(22) Filed: Aug. 23, 2024

(30) Foreign Application Priority Data

Oct. 12, 2023 (CN) .......................... 202311323193.X

(51) Int. Cl.
  *C08B 37/00* (2006.01)
  *C08L 5/00* (2006.01)
(52) U.S. Cl.
  CPC ...... *C08B 37/0003* (2013.01); *C08B 37/0024* (2013.01); *C08L 5/00* (2013.01)

(58) Field of Classification Search
  CPC .... C08B 37/0003; C08B 37/0024; C08L 5/00
  See application file for complete search history.

(56) References Cited

PUBLICATIONS

Rao et al., Biocatalysis and Agricultural Biotechnology, 2021, 37, article 102163, 13 pages. (Year: 2021).*
Xue et al., Food Bioscience, 2019, 32, article 100452, 7 pages. (Year: 2019).*

* cited by examiner

*Primary Examiner* — Jonathan S Lau

(57) ABSTRACT

A preparation method of a *Lentinula edodes* polysaccharide rich in β-glucan includes: (1) extracting the *Lentinula edodes* polysaccharide to obtain a filtrate; (2) concentrating the filtrate to obtain a supernatant; (3) precipitating a crude *Lentinula edodes* polysaccharide from the supernatant using anhydrous ethanol to obtain a first precipitate; and (4) purifying the first precipitate to obtain the *Lentinula edodes* polysaccharide. The *Lentinula edodes* polysaccharide rich in the β-glucan has stable quality, and its yield, polysaccharide content and β-glucan content are significantly improved compared with water extraction and alcohol precipitation methods in the related art. In vitro pharmacological experiments prove that the *Lentinula edodes* polysaccharide rich in the β-glucan has good anti-inflammatory activity and can be applied to preparation of drugs or health foods.

2 Claims, 1 Drawing Sheet

BETA-GLUCAN-RICH LENTINULA EDODES POLYSACCHARIDE AND PREPARATION METHOD THEREOF

CROSS-REFERENCE TO RELATED APPLICATION

This application claims priority to Chinese Patent Application No. 202311323193.X, filed Oct. 12, 2023, which is herein incorporated by reference in its entirety.

TECHNICAL FIELD

The disclosure relates to the field of edible fungi, and more particularly to a *Lentinula edodes* polysaccharide rich in beta-glucan (β-glucan) and its preparation method.

BACKGROUND

*Lentinula edodes* (Berk.) Pegler belongs to the class Basidiomycetes, order Agaricales, family Tricholomataceae, and genus Lentinus. The *Lentinula edodes* originates in China and is the second most cultivated edible mushroom in the world. The *Lentinula edodes* has a variety of functions, including anti-tumor, antibacterial, antioxidant, anti-inflammatory, blood lipid-lowering, and immunoregulatory activities. Studies indicate that polysaccharides are the most important class of compounds in the *Lentinula edodes* with pharmacological effects and nutritional value.

As main active components in the *Lentinula edodes*, the structure and function of the polysaccharides have attracted much attention, especially β-glucan, which has become a hot topic in the field of polysaccharide research due to its well-defined structure and significant effects. Over the past few decades, methods for extracting the polysaccharides from the *Lentinula edodes* developed rapidly, but there are still many problems. For example, a common hot water extraction method has problems such as low efficiency, low yield and low purity of the polysaccharides. Acid-base extraction may change the structure of the polysaccharides, affecting their biological activity.

Therefore, it is necessary to research and develop a method for extracting the polysaccharides from the *Lentinula edodes* with higher extraction efficiency and higher active components.

SUMMARY

The disclosure aims at providing a preparation method of a *Lentinula edodes* polysaccharide rich in β-glucan, the preparation method includes following steps:

(1) extracting the *Lentinula edodes* polysaccharide, including: using *Lentinula edodes* fruit bodies as raw material, pulverizing the raw material and then sieving the pulverized raw material through a 40-60 mesh sieve to obtain *Lentinula edodes* powder, adding the *Lentinula edodes* powder with water and SuperLIQ® 1.5TPlus high-temperature resistant amylase to obtain a mixed solution, and heating the mixed solution to boiling and then keeping for 120-180 minutes (min) followed by filtering to obtain a filtrate; where a material-liquid ratio is 1 gram (g) of the *Lentinula edodes* powder: 15-20 milliliters (mL) of the water, and an addition amount of the SuperLIQ® 1.5TPlus high-temperature resistant amylase is 60-80 microliters (μL) of amylase solution per 1 g of the *Lentinula edodes* powder;

(2) concentrating the filtrate, including: heating the filtrate to boiling and concentrating to obtain a concentrated solution with a material-liquid ratio of 1 g of the *Lentinula edodes* powder: 9-11 mL of the concentrated solution, centrifuging the concentrated solution at 8000 revolutions per minute (rpm) for 20 min to obtain a supernatant;

(3) precipitating a crude *Lentinula edodes* polysaccharide using anhydrous ethanol, including: adding the anhydrous ethanol to the supernatant while stirring continuously until an ethanol content reaches 18-23% to obtain a mixture, standing the mixture at 4° C. for 10-12 hours and then centrifuging the mixture at 8000 rpm to remove an ethanol supernatant to obtain a first precipitate; and (4) purifying the first precipitate, including: adding 20-23% ethanol with a volume 5-8 times a volume of the first precipitate to the first precipitate and then shaking vigorously followed by centrifuging at 8000 rpm for 15 min to obtain a second precipitate, repeating above steps for the second precipitate to obtain a third precipitate, adding water to the third precipitate for dissolving to obtain a solution, evaporating the ethanol from the solution in a water bath at 80-100° C. followed by freeze-drying to obtain a gray-white cotton-like solid sample as the *Lentinula edodes* polysaccharide rich in the β-glucan.

The disclosure further provides the *Lentinula edodes* polysaccharide rich in the β-glucan prepared by the preparation method.

The *Lentinula edodes* polysaccharide rich in the β-glucan provided by the disclosure has stable quality, and its yield, polysaccharide content and β-glucan content are significantly improved compared with water extraction and alcohol precipitation methods in the related art. In vitro pharmacological experiments prove that the *Lentinula edodes* polysaccharide rich in the β-glucan has good anti-inflammatory activity and can be applied to preparation of drugs or health foods.

DETAILED DESCRIPTION OF EMBODIMENTS

Figure 1:
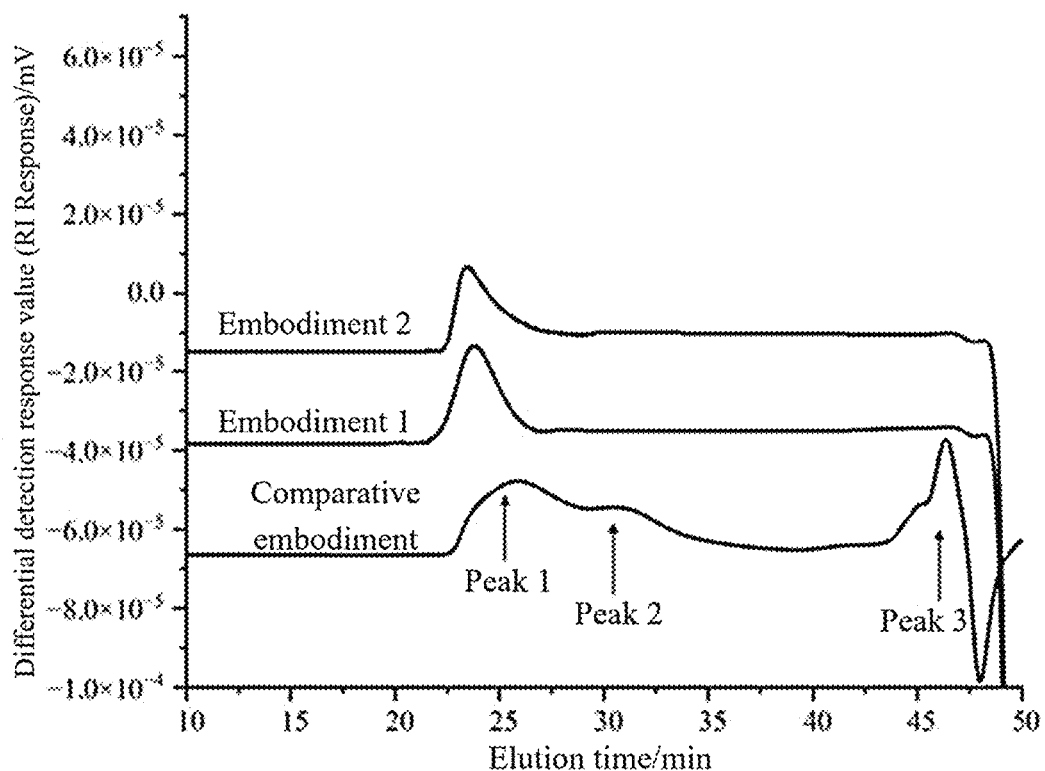
FIG. 1 illustrates a high-performance size exclusion chromatography (HPSEC) diagram of *Lentinula edodes* polysaccharides prepared by different methods.

Materials and Reagents:

Jiuxiang No. 3 *Lentinula edodes* fruiting bodies (purchased from Shandong Qihe Biotechnology Co., Ltd.);

SuperLIQ® 1.5TPlus high-temperature resistant amylase (purchased from Bestzyme Bio-Engineering Co., Ltd.);

sulfuric acid, ethanol, aniline blue, glycine, phosphoric acid, sulfanilamide, and N-1-naphthylethylenediamine dihydrochloride (purchased from Sinopharm Chemical Reagent Co., Ltd);

scleroglucan (purchased from Seebio Biotech (Shanghai) Co., Ltd.);

cells and their detection kits and Dulbecco's modified eagle medium (DMEM) culture medium (purchased from Invitrogen Corporation, USA);

penicillin and streptomycin purchased from Sigma-Aldrich Corporation, USA; and colorless 1640 culture medium (Gibco, USA).

Main Instruments and Equipment:

Synergy HT multi-functional microplate reader (BIO-TEK, USA)

2695 high-performance liquid chromatograph and 2996 diode array detector (Waters, USA); and DAWN HELEOS 8 laser light scattering detector (Wyatt, USA).

Embodiment 1: Preparation of a *Lentinula edodes* Polysaccharide

The Jiuxiang No. 3 *Lentinula edodes* fruiting bodies are taken, pulverized and then sieved through a 40-mesh sieve to obtain *Lentinula edodes* powder. 40 g of the *Lentinula edodes* powder is weighed and added with 800 ml distilled water and 2.4 mL high-temperature resistant amylase followed by stirring thoroughly to obtain a mixed solution, and the mixed solution is heated to boiling and then hold for a gentle boil state for 180 min followed by filtering to obtain a filtrate. The filtrate is concentrated to obtain a concentrated solution with a volume of 440 mL, the concentrated solution is centrifuged at 8000 rpm for 20 min to obtain a supernatant. The supernatant is slowly added with anhydrous ethanol while stirring continuously until an ethanol content reaches 20% (volume per volume, v/v) to obtain a mixture, the mixture is stood at 4° C. for 10 h and then centrifuged at 8000 rpm for 15 min to obtain a first precipitate. The first precipitate is added with 30 mL of 20% (v/v) ethanol and then shaken vigorously followed by centrifuging at 4° C. at 8000 rpm for 15 min to obtain a second precipitate. The above operations are repeated to the second precipitate to obtain a third precipitate, the third precipitate is added with water for dissolving and then in a water bath at 80-100° C. to evaporate the ethanol followed by freeze-drying to obtain a gray-white cotton-like solid sample (i.e., a freeze-dried *Lentinula edodes* polysaccharide sample).

Embodiment 2: Preparation of a *Lentinula edodes* Polysaccharide

The Jiuxiang No. 3 *Lentinula edodes* fruiting bodies are taken, pulverized and then sieved through a 40-mesh sieve to obtain *Lentinula edodes* powder. 40 g of the *Lentinula edodes* powder is weighed and added with 800 mL distilled water and 3.2 mL high-temperature resistant amylase followed by stirring thoroughly to obtain a mixed solution, and the mixed solution is heated to boiling and then hold for a gentle boil state for 240 min followed by filtering to obtain a filtrate. The filtrate is concentrated to obtain a concentrated solution with a volume of 360 mL, the concentrated solution is centrifuged at 8000 rpm for 20 min to obtain a supernatant. The supernatant is slowly added with anhydrous ethanol while stirring continuously until an ethanol content reaches 20% (v/v) to obtain a mixture, the mixture is stood at 4° C. for 10 h and then centrifuged at 8000 rpm for 15 min to obtain a first precipitate. The first precipitate is added with 30 mL of 20% (v/v) ethanol and then shaken vigorously followed by centrifuging at 4° C. at 8000 rpm for 15 min to obtain a second precipitate. The above operations are repeated to the second precipitate to obtain a third precipitate, the third precipitate is added with water for dissolving and then in a water bath at 80-100° C. to evaporate the ethanol followed by freeze-drying to obtain a gray-white cotton-like solid sample (i.e., a freeze-dried *Lentinula edodes* polysaccharide sample).

Comparative Embodiment

The Jiuxiang No. 3 *Lentinula edodes* fruiting bodies are taken, pulverized and then sieved through a 40-mesh sieve to obtain *Lentinula edodes* powder. 40 g of the *Lentinula edodes* powder is weighed and added with 800 mL distilled water followed by stirring thoroughly to obtain a mixed solution, and the mixed solution is heated to boiling and then hold for a gentle boil state for 180 min followed by filtering to obtain a filtrate. The filtrate is concentrated to obtain a concentrated solution with a volume of 440 mL, the concentrated solution is centrifuged at 8000 rpm for 20 min to obtain a supernatant. The supernatant is slowly added with anhydrous ethanol while stirring continuously until an ethanol content reaches 20% (v/v) to obtain a mixture, the mixture is stood at 4° C. for 10 h and then centrifuged at 8000 rpm for 15 min to obtain a first precipitate. The first precipitate is added with 30 mL of 20% (v/v) ethanol and then shaken vigorously followed by centrifuging at 4° C. at 8000 rpm for 15 min to obtain a second precipitate. The above operations are repeated to the second precipitate to obtain a third precipitate, the third precipitate is added with water for dissolving and then in a water bath at 80-100° C. to evaporate the ethanol followed by freeze-drying to obtain a gray-white cotton-like solid sample (i.e., a freeze-dried *Lentinula edodes* polysaccharide sample).

Embodiment 3: Physicochemical Index Testing of the *Lentinula edodes* Polysaccharide (1) *Lentinula edodes* Polysaccharide Yield Polysaccharide yield (%)=a weight of a freeze-dried precipitate (i.e., the gray-white cotton-like solid sample)/a weight of extracted raw material (i.e., the Jiuxiang No. 3 *Lentinula edodes* fruiting bodies)×100%.

(2) Polysaccharide Content Detection

A proper amount of the freeze-dried *Lentinula edodes* polysaccharide sample is weighed and dissolved to obtain a sample solution, then a total polysaccharide content is determined by a phenol-sulfuric acid method.

The phenol-sulfuric acid method specifically includes following steps: 5% phenol solution, concentrated sulfuric acid, and 0.1 milligrams per milliliter (mg/mL) glucose standard solution (Sigma-Aldrich Corporation, USA) are prepared. 1 mL of glucose standard solution (at concentrations of 0.00, 0.01, 0.02, 0.04, 0.06, 0.08 and 0.10 mg/mL), 1 mL of the sample solution, 0.5 mL of the 5% phenol solution and 2.5 mL of the concentrated sulfuric acid are added to a test tube and mixed well. Then, the test tube is placed in a water bath at 100° C. for 15 min and then taken out followed by cooling to room temperature to obtain a cooled solution, 200 μL of the cooled solution is taken and placed in a microplate, and absorbance is measured at 490 nanometers (nm). A standard curve is drawn with a standard solution concentration (mg/mL) as an X-axis and the absorbance as a Y-axis, and the total polysaccharide content is calculated.

(3) Testing of a β-Glucan Content in the *Lentinula edodes* Polysaccharides

A proper amount of the freeze-dried *Lentinula edodes* polysaccharide sample (respectively prepared in the embodiment 1, the embodiment 2 and the comparative embodiment) is weighed and dissolved with 1 mole per liter (mol/L) of potassium hydroxide (KOH) solution to obtain sample solution, and the β-glucan content is determined by an aniline blue fluorescence method.

The aniline blue fluorescence method specifically includes following steps: 300 μL of the sample solution is taken and added into a centrifuge tube (2.0 mL), and 30 μL of the KOH solution (6 mol/L) is added into the centrifuge tube. Then, the centrifuge tube is placed at 80° C. for incubation for 30 min and then cooled in an ice bath to obtain a cooled centrifuge tube, 630 μL of aniline blue working solution [0.1% aniline blue aqueous solution: 1 mol/L hydrogen chloride (HCl): 1 mol/L glycine aqueous solution (1 mol/L KOH solution with a potential of hydrogen adjusted to 9.5)=40:21:59] is added into the cooled centrifuge tube followed by incubating at 50° C. for 30 min to obtain reacted solution. 200 μL of the reacted solution is transferred to a 96-well plate. Fluorescence values at an excitation wavelength of 398 nm and an emission wavelength of 502 nm are measured respectively. Each freeze-dried *Lentinula edodes* polysaccharide sample is repeated three times to obtain an average value. The scleroglucan is used as a standard to prepare standard solution (0-100 micrograms per milliliter, μg/mL), the above operation steps are performed to the standard solution for testing, a standard curve is drawn, and the β-glucan content is calculated.

A comparison result of the physicochemical index testing is shown in Table 1, compared to the comparative embodiment, the *Lentinula edodes* polysaccharide yield, the polysaccharide content and the β-glucan content of the freeze-dried *Lentinula edodes* polysaccharide samples prepared in the embodiment 1 and the embodiment 2 are significantly increased. The yield increases by about 41%, the polysaccharide content increases by about 17%, and the β-glucan content increases by about 47%. It is indicated that the *Lentinula edodes* polysaccharides prepared in the embodiment 1 and the embodiment 2 are conducive to release of the *Lentinula edodes* polysaccharide, especially the β-glucan, and can significantly improve the polysaccharide yield.

TABLE 1 comparison of the yields, the polysaccharide contents and the β-glucan contents in the *Lentinula edodes* polysaccharides prepared by different methods

| Group | Yield (%) | Polysaccharide content (%) | β-glucan content (%) |
|---|---|---|---|
| Embodiment 1 | 0.99 | 91.65 ± 0.04 | 85.38 ± 0.18 |
| Embodiment 2 | 0.98 | 91.33 ± 0.01 | 85.70 ± 0.07 |
| Comparative embodiment | 0.70 | 78.09 ± 0.01 | 58.70 ± 0.02 |

Embodiment 4: Molecular Weight Distribution Map Collection of the *Lentinula edodes* Polysaccharides A method for collecting a molecular weight distribution map: 2 mg of a sample (i.e., the freeze-dried *Lentinula edodes* polysaccharide sample) is weighed and dissolved in water to prepare a sample solution at a weight concentration of 1 mg/mL, the sample solution is centrifuged at 12000 rpm for 20 min to obtain a supernatant. A HPSEC-MALLS-RID system is used to determine the molecular weight distribution of the sample. Chromatographic conditions: a chromatographic column is a series connection of G6000PWXL (TSK-GEL) and G4000PWXL (TSK-GEL), a mobile phase is 0.05 mol/L sodium nitrate ($NaNO_3$) solution, a flow rate is 0.5 milliliters per minute (mL/min), a column temperature is 35° C., and an injection volume is 100 μL.

Analysis results of the HPSEC-MALLS-RID are shown in FIG. 1, it can be seen that the *Lentinula edodes* polysaccharides (i.e., the freeze-dried *Lentinula edodes* polysaccharide sample) prepared in the embodiment 1 and the embodiment 2 both show a single, relatively uniform symmetrical peak, with polydispersity coefficients of 1.05 and 1.06, respectively, and weight-average molecular weights of $3.22 \times 10^6$ grams per mole (g/mol) and $3.75 \times 10^6$ g/mol, respectively. It is indicated that the *Lentinula edodes* polysaccharides with good uniformity and high purity can be obtained after enzyme treatment. In contrast, the *Lentinula edodes* polysaccharide prepared in the comparative embodiment contains three peaks. Peak 1 and Peak 2 correspond to components with weight-average molecular weights of $1.44 \times 10^7$ g/mol and $5.16 \times 10^6$ g/mol, respectively, and polydispersity coefficients of 1.17 and 1.09, respectively, representing components with narrow molecular weight distribution. Peak 3 corresponds to a component with a weight-average molecular weight of $7.32 \times 10^4 + $g/mol and a polydispersity coefficient of 3.02, indicating a component with a wide molecular weight distribution.

It can be seen from FIG. 1 that the *Lentinula edodes* polysaccharides prepared in the embodiment 1 and the embodiment 2 are more homogeneous and have higher purity compared to the comparative embodiment.

Embodiment 5: Effects of the *Lentinula edodes* Polysaccharides Prepared by the Different Methods on Release of NO from RAW264.7 Cells Stimulated by LPS Reagent preparation: (1) Sample solution preparation: under sterile conditions, polysaccharide sample solutions are prepared with the freeze-dried *Lentinula edodes* polysaccharide sample prepared in the embodiment 1, the embodiment 2 and the comparative embodiment and phosphate buffered saline (PBS), each polysaccharide sample solution is set at a concentration of 10 micrograms per milliliter (μg/mL). (2) culture medium preparation: 1% penicillin and streptomycin are added to the DMEM culture medium and mixed well. When using, 10% fetal bovine serum (FBS) is added to the DMEM culture medium to prepare a DMEM complete culture medium. (3) PBS Preparation: 8.00 g of sodium chloride (NaCl), 0.20 g of potassium chloride (KCl), 0.24 g of anhydrous potassium dihydrogen phosphate ($KH_2PO_4$) and 3.60 g of disodium hydrogen phosphate dodecahydrate ($Na_2HPO_4 \cdot 12H_2O$) are weighed and added to 1 L of ultrapure water and then mixed well followed by sterilizing at high pressure to obtain the PBS. (4) LPS solution preparation: 1.0 mg of the LPS is weighed and dissolved in 1 mL of the PBS for fully dissolving to obtain stock solution with a weight concentration of 1.0 mg/mL, and the stock solution is stored at −20° C. for future use. When in use, the stock solution is diluted according to a required weight concentration to obtain the LPS. (5) Griess reagent preparation: The Griess reagent needs to be prepared away from light, phosphoric acid ($H_3PO_4$) is added to 250 mL of distilled water at a ratio of 1:40 and then added with 0.5 g of the sulfanilamide and 0.5 g of the N-1-naphthylethylenediamine dihydrochloride followed by completely dissolving to obtain the Griess reagent. The Griess reagent is stored at 4° C. (6) Colorless 1640 culture medium preparation: 1% penicillin and streptomycin are added to the colorless 1640 culture medium and mixed well to obtain a processed culture medium. When using, 10% FBS is then added to the processed culture medium to prepare the prepared colorless 1640 culture medium.

Cell culture: the macrophage RAW264.7 cell line (from the Chinese Academy of Sciences Cell Bank) is cultivated with the DMEM complete culture medium, with incubator conditions set at 5% carbon dioxide ($CO_2$), a temperature of 37° C., and saturated humidity.

Detection of the NO release from the RAW264.7 cells: the number of cells is calculated, the RAW264.7 cells are diluted with the prepared colorless 1640 culture medium to obtain a cell suspension of $5\times10^5$ cells/mL, the cell suspension is transferred to a well plate with 160 μL per well and then cultured at 37° C. for 4-6 hours until the cells are fully adhered to well walls to obtain cell samples. The cell samples are divided into groups including sample groups (including an embodiment 1 group, an embodiment 2 group and a comparative embodiment group), a model group and a negative control group. The cell samples of the sample groups are added with 20 μL of the LPS (at a concentration of 10 μg/mL) and 20 μL of respective polysaccharide sample solution. The cell samples of the model group are added with 20 μL of the LPS and 20 μL of the PBS. The cell samples of the negative control group are added with 40 μL of the PBS. After culturing at 37° C. for 48 hours, 100 μL of supernatants of each group are taken and added with 50 μL of the Griess reagent for react for 10 min. An optical density (OD) value at 543 nm is measured and then substituted into the standard curve to calculate an NO release amount. Specific values are shown in FIG. 2.

Figure 2:
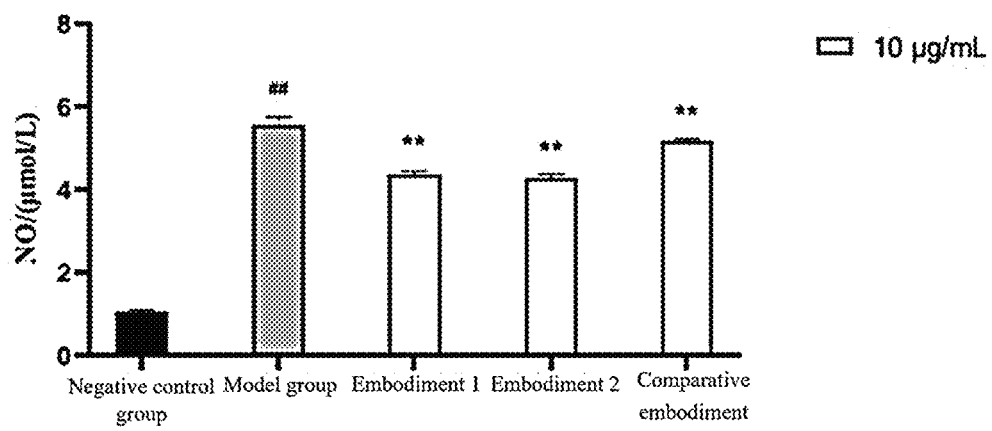
FIG. 2 illustrates effects of the *Lentinula edodes* polysaccharides prepared by the different methods on release of nitric oxide (NO) from RAW264.7 cells stimulated by lipopolysaccharide (LPS). Where #represents a significant difference from a negative control group (P<0.05), ##represents a highly significant difference from the negative control group (P<0.01), * represents a significant difference from a model group (P<0.05), and ** represents a highly significant difference from the model group (P<0.01).

It can be seen from FIG. 2, when the concentration of the LPS is 10 μg/mL, the NO release amount of the model group is significantly higher than that of the negative control group, indicating that an inflammatory model is successfully constructed. Compared with the model group, the *Lentinula edodes* polysaccharides prepared in the embodiment 1 and the embodiment 2 have a significant effect in reducing the release of the NO from the RAW264.7 cells stimulated by the LPS ($P<0.01$). Moreover, an inhibitory effect of the *Lentinula edodes* polysaccharides prepared in the embodiment 1 and the embodiment 2 on the release of the NO from the RAW264.7 cells stimulated by the LPS is better than that of the comparative embodiment, indicating that an anti-inflammatory effect of the *Lentinula edodes* polysaccharides prepared in the embodiment 1 and the embodiment 2 is better.

What is claimed is:

1. A preparation method of a *Lentinula edodes* polysaccharide rich in β-glucan, comprising:

(1) extracting the *Lentinula edodes* polysaccharide, comprising: using *Lentinula edodes* fruit bodies as raw material, pulverizing the raw material and then sieving the pulverized raw material through a 40-60 mesh sieve to obtain *Lentinula edodes* powder, adding the *Lentinula edodes* powder with water and an amylase to obtain a mixed solution, and heating the mixed solution to boiling and then keeping for 120-180 minutes (min) followed by filtering to obtain a filtrate; wherein a material-liquid ratio is 1 gram (g) of the *Lentinula edodes* powder: 15-20 milliliters (mL) of the water, and an addition amount of the amylase is 60-80 microliters (μL) of amylase solution per 1 g of the *Lentinula edodes* powder;

(2) concentrating the filtrate, comprising: heating the filtrate to boiling and concentrating to obtain a concentrated solution with a material-liquid ratio of 1 g of the *Lentinula edodes* powder: 9-11 mL of the concentrated solution, centrifuging the concentrated solution at 8000 revolutions per minute (rpm) for 20 min to obtain a supernatant;

(3) precipitating a crude *Lentinula edodes* polysaccharide using anhydrous ethanol, comprising: adding the anhydrous ethanol to the supernatant while stirring continuously until an ethanol content reaches 18-23% to obtain a mixture, standing the mixture at 4° C. for 10-12 hours and then centrifuging the mixture at 8000 rpm to remove an ethanol supernatant to obtain a first precipitate; and (4) purifying the first precipitate, comprising: adding 20-23% ethanol with a volume 5-8 times a volume of the first precipitate to the first precipitate and then shaking vigorously followed by centrifuging at 8000 rpm for 15 min to obtain a second precipitate, repeating above steps for the second precipitate to obtain a third precipitate, adding water to the third precipitate for dissolving to obtain a solution, evaporating the ethanol from the solution in a water bath at 80-100° C. followed by freeze-drying to obtain a gray-white cotton-like solid sample as the *Lentinula edodes* polysaccharide rich in the β-glucan.

2. The *Lentinula edodes* polysaccharide rich in the β-glucan prepared by the preparation method as claimed in claim 1.

* * * * *